United States Patent
Moriyama et al.

(10) Patent No.: US 7,014,260 B2
(45) Date of Patent: Mar. 21, 2006

(54) SEAT ASSEMBLE FOR VEHICLE

(75) Inventors: Genta Moriyama, Anjo (JP); Naoaki Hoshihara, Obu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 130 days.

(21) Appl. No.: 10/780,676

(22) Filed: Feb. 19, 2004

(65) Prior Publication Data

US 2004/0222681 A1 Nov. 11, 2004

(30) Foreign Application Priority Data

Feb. 25, 2003 (JP) .................................... 2003-047815

(51) Int. Cl.
*B60N 2/36* (2006.01)

(52) U.S. Cl. ..................................... 297/15; 296/65.09
(58) Field of Classification Search .................. 297/15; 296/65.09
See application file for complete search history.

(56) References Cited

U.S. PATENT DOCUMENTS

| | | | | |
|---|---|---|---|---|
| 4,957,321 A | * | 9/1990 | Martin et al. ............ | 296/65.09 |
| 4,979,773 A | * | 12/1990 | Eubank .................... | 296/65.05 |
| 4,986,591 A | * | 1/1991 | Martienssen et al. .... | 296/65.09 |
| 5,195,795 A | * | 3/1993 | Cannera et al. .......... | 296/65.09 |
| 5,482,352 A | | 1/1996 | Leal et al. | |
| 5,752,845 A | | 5/1998 | Fu | |
| 5,782,537 A | | 7/1998 | Leistra et al. | |
| 6,012,755 A | * | 1/2000 | Hecht et al. ......... | 296/65.09 X |
| 6,106,046 A | * | 8/2000 | Reichel ................... | 297/15 X |
| 6,279,982 B1 | * | 8/2001 | Nishimura et al. ...... | 296/65.09 |
| 6,382,491 B1 | * | 5/2002 | Hauser et al. ........... | 297/15 X |
| 6,435,589 B1 | * | 8/2002 | Shimizu et al. .......... | 297/15 X |
| 6,629,721 B1 | * | 10/2003 | Macey ....................... | 297/15 |
| 6,644,730 B1 | * | 11/2003 | Sugiura et al. ............... | 297/15 |
| 6,749,247 B1 | * | 6/2004 | Mack et al. ............. | 296/65.09 |
| 2004/0169404 A1 | * | 9/2004 | Imajo et al. .............. | 297/15 X |

FOREIGN PATENT DOCUMENTS

| | | | |
|---|---|---|---|
| FR | 2825330 A | 12/2002 | |
| GB | 2367746 A | 4/2002 | |
| JP | 10310002 A | 11/1998 | |
| JP | 11-48840 A | 2/1999 | |

* cited by examiner

*Primary Examiner*—Rodney B. White
(74) *Attorney, Agent, or Firm*—Burns, Doane, Swecker & Mathis, L.L.P.

(57) ABSTRACT

A seat assembly for a vehicle comprising a four joint link mechanism for storing a seat into concave portion provided on a floor of the vehicle and a motor device driving the four joint link mechanism, wherein a wire harness connected to the motor device is wired in a space provided between a cover attached to a rear link which forms the four joint link mechanism and the rear link.

8 Claims, 5 Drawing Sheets

SEAT ASSEMBLE FOR VEHICLE

CROSS REFERENCE TO RELATED APPLICATIONS

This application is based on and claims priority under 35 U.S.C. §119 with respect to a Japanese Patent Application 2003-047815, filed on Feb. 25, 2003, the entire content of which is incorporated herein by reference.

FIELD OF THE INVENTION

This invention generally relates to a seat assembly for a vehicle. More particularly, the present invention pertains to a seat assembly for a vehicle which is retractable and stored within a storage space formed in a vehicle floor when the seat is not intended to be used.

BACKGROUND OF THE INVENTION

A known seat assembly is disclosed in Japanese Patent Laid-Open Publication No. H11-48840. According to the disclosed seat assembly, a reclining mechanism includes a seat back folded on a seat and a link mechanism located between a side frame of the seat cushion and a vehicle floor or bottom of a concave portion to store the seat. Thus, the seat, in which the seat back has been folded, is retractable and stored within a concave portion by using the link mechanism.

In the storage of the seat, the seat cushion or bottom or back face of the seat back makes a same plane to the vehicle floor. Such seat assembly described above is generally used since the vehicle component for baggage can be extended and usability of interior space can be improved.

In the above-mentioned seat assembly, which is an example of the disclosed seat assembly, a bracket is fixed on the vehicle floor in front of the concave portion, a link member including a elbow portion is rotatably supported to side frame of the seat cushion and the bracket.

The rotation of the link member is carried out by a motor device which is supported on the side frame supporting seat cushion. Folding of the seat back on the seat cushion is carried out by the seat reclining mechanism supported to the seatback frame. The reclining mechanism is driven by an electric motor, thus the seat back can be tiltable to a favorable position for an occupant of the seat.

The power from a power source for the motor device and reclining mechanism is supplied through a wire harness which is wired from the bottom of the concave portion to the motor device and the reclining mechanism.

The wire harness is movable in response to the movement of the seat, and the position of the wire harness to the vehicle floor is variable since the seat moves between using position and storing position. To allow the movement of the wire harness, the wire harness is not rigidly fixed to the link mechanism, and extra length of the wire harness has to be needed.

The extra region of the wire harness is positioned almost entire area between the seat and bottom of the concave portion, and the extra region can not be clamped for fixation.

The extra region of the wire harness may make unfixed wire harness entangle with seat, or looseness of the extra region catch a baggage or a leg of the occupant. Thus breaking of wire or short-circuit may occur.

SUMMARY OF THE INVENTION

In light of foregoing, to an aspect of the present invention, a seat assembly for a vehicle includes a four joint link mechanism for storing a seat into concave portion provided on a floor of the vehicle and a motor device driving the four joint link mechanism, wherein a wire harness for connecting to the motor device is wired in a space between a cover provided at a rear link comprising the four joint link mechanism and the rear link.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

A preferred embodiment of the present invention will be described hereinbelow in detail with reference to the accompanying drawings.

A first embodiment of the present invention is explained referring to FIGS. 1 to 4.

Figure 1:
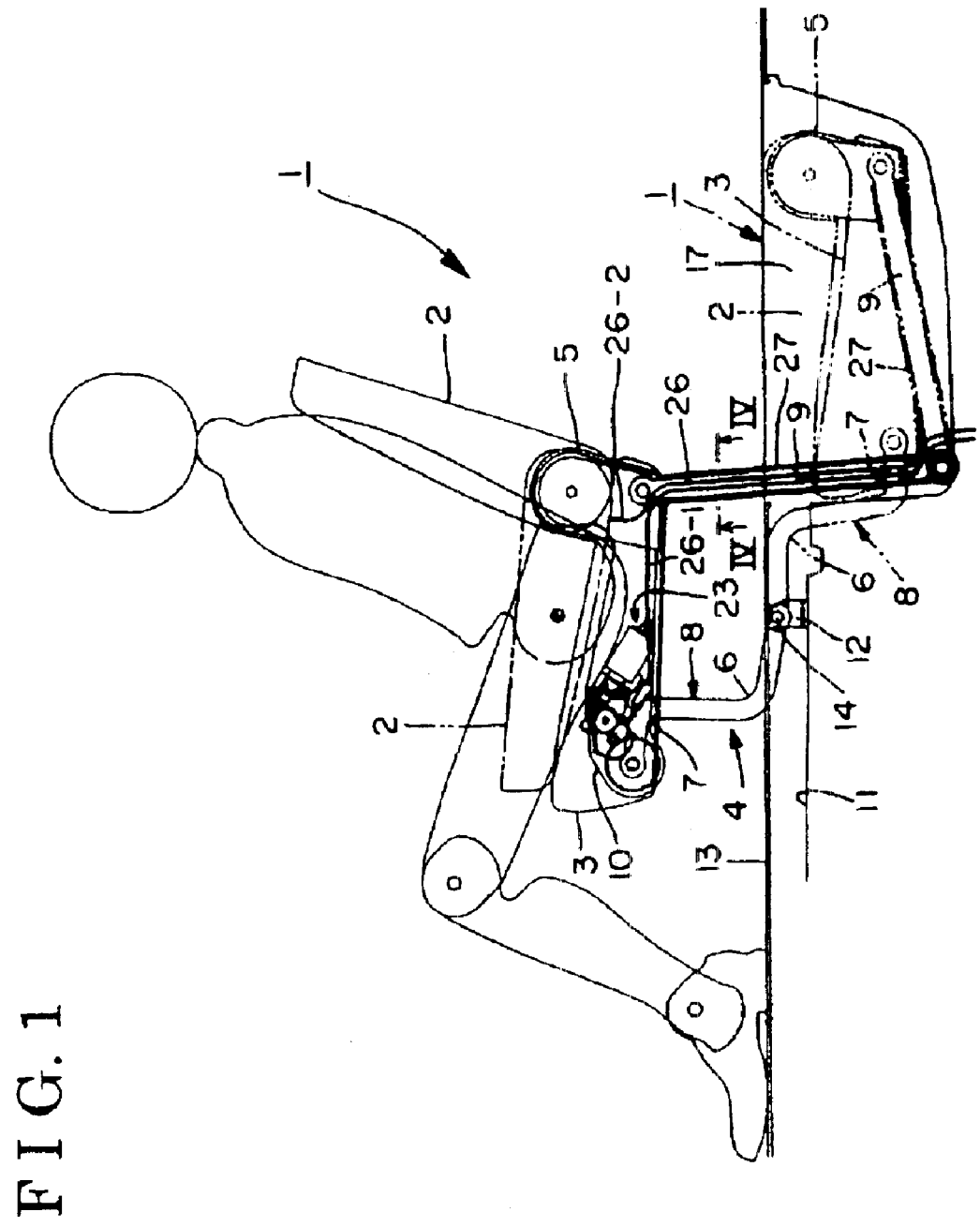
FIG. 1 is a side view of a seat assembly according to a first embodiment of the present invention.
Figure 2:
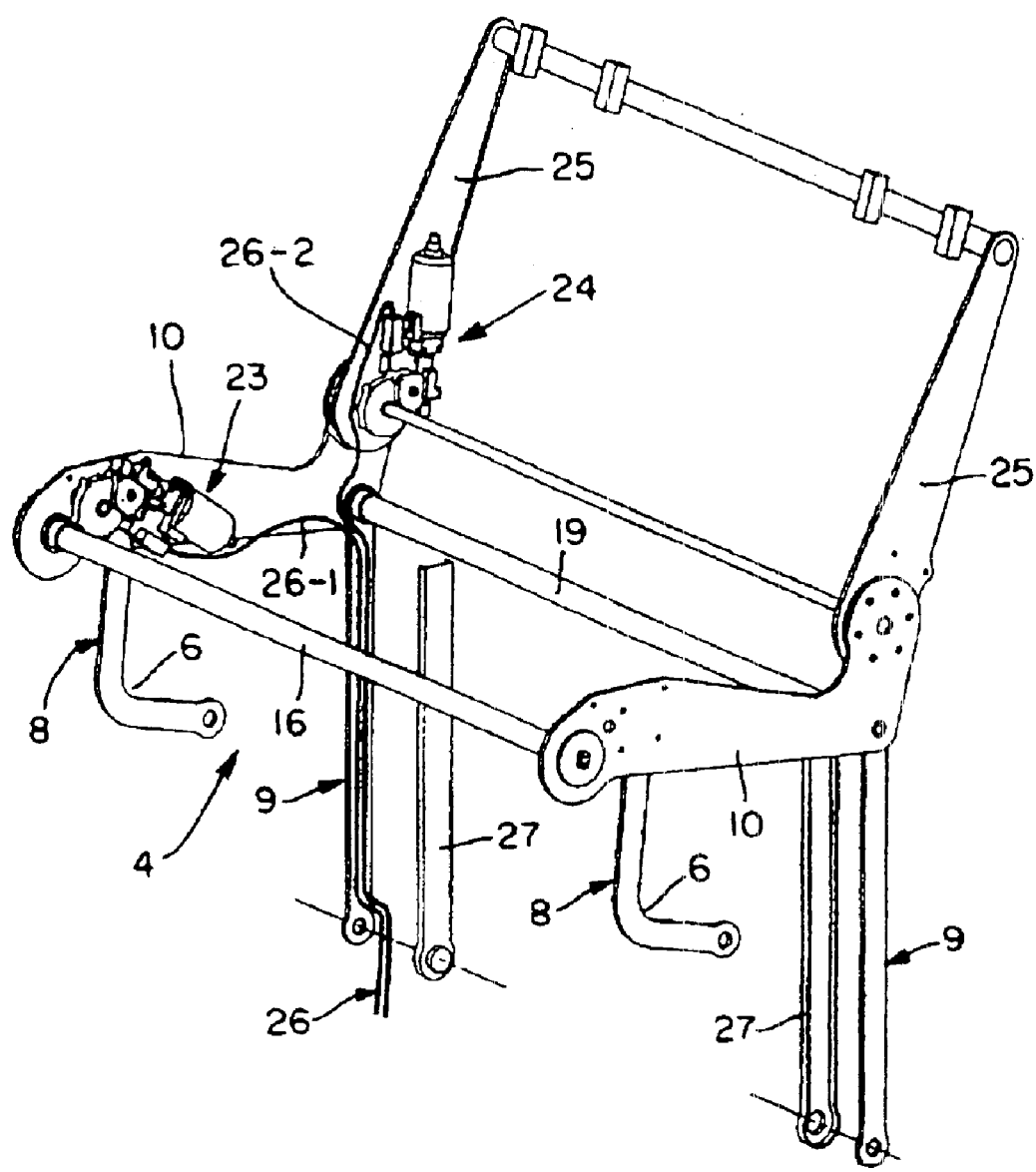
FIG. 2 is a perspective view of the frame of the seat assembly according to the first embodiment of the present invention.
Figure 3:
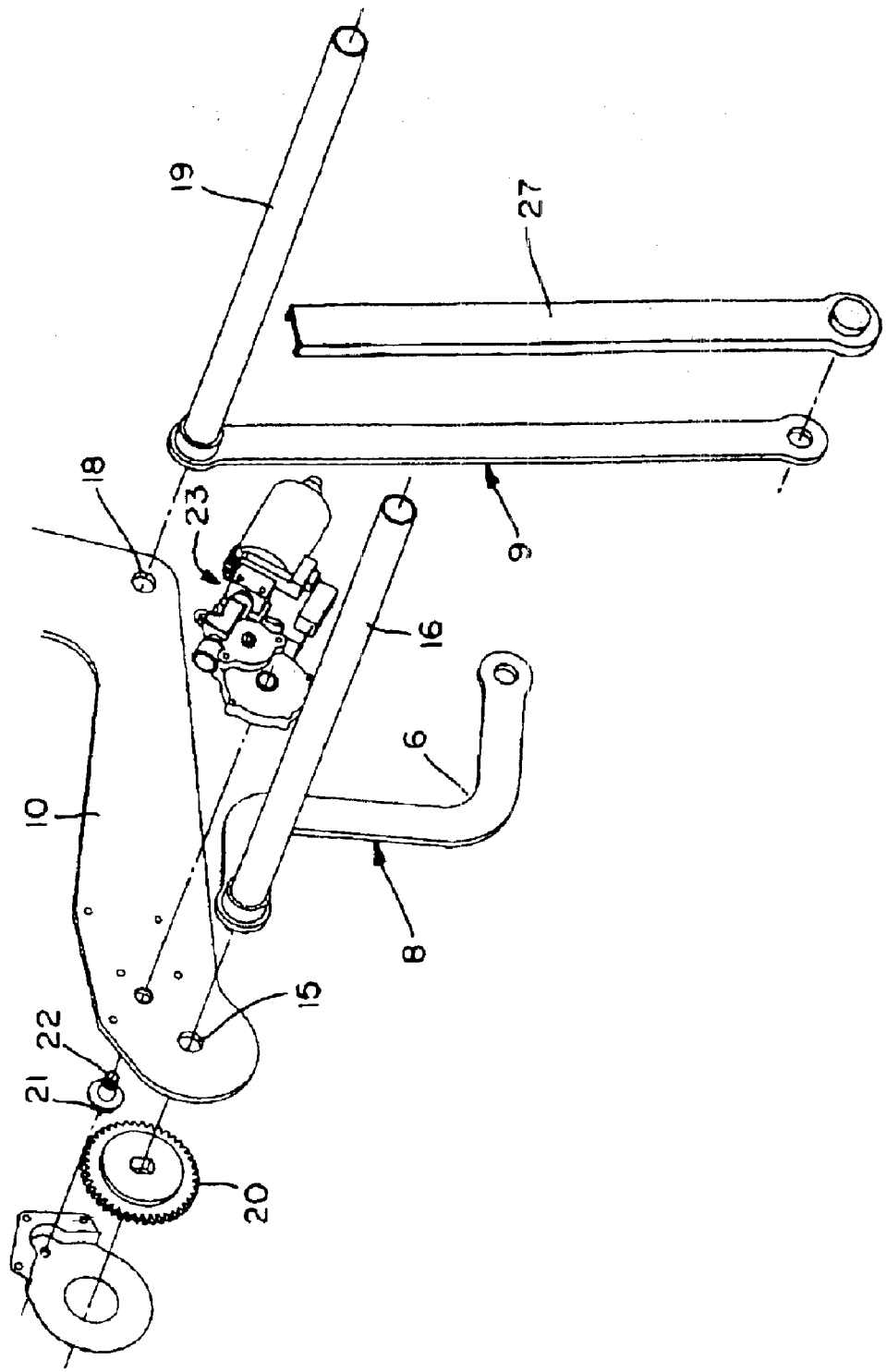
FIG. 3 is an exploded view of a portion of FIG. 2.
Figure 4:
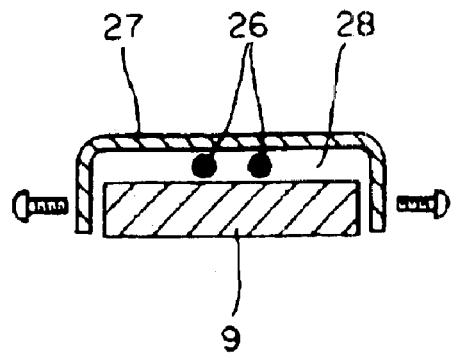
FIG. 4 is a partial cross sectional view taken along the line IV—IV of FIG. 1.

As shown in FIG. 1, a seat assembly 1 includes a seatback 2, a seat cushion 3 and a four joint link mechanism 4. The seatback 2 is foldable on the seat cushion 3 using a reclining mechanism or a folding mechanism 5.

The four joint link mechanism includes a front link 8 including two elbow portions 6, 7 and a straight rear link 9. Both links 8, 9 are provided at bilateral side frames 10 of the seat cushion 3.

An upper end of the front link 8 is pivotally connected to one of the side frame 10, and the bottom end of the front link 8 is pivotally connected to a bracket 12 fixed to floor 11 using a pin 14. The bracket 12 is provided in front of a concave portion 17 and at the same time, is provided below the outer surface of a carpet 13 spread on the floor 11. The bracket 12 is fixed to the floor 11 at a lower end. The cross section of the bracket 12 is shaped as L-shape or U-shape. Upper side of the front link 8 is pivotally connected to a hole 15 of the side frame. The front links 8, 8 (both sides) are connected together using a pipe 16.

The rear link 9 is shaped as an elongate plate. The lower end of the rear link 9 is pivotally connected to the sidewall of the concave portion 17 or a bracket fixed to the sidewall or bottom wall of the concave portion 17. An upper end of the rear link 9 is pivotally connected to a hole 18 of the side frame 10. The side frames (both sides) 10, 10 are connected together using a pipe 19.

A gear wheel 20 provided at the outer side of the side frame 10 and is rigidly fixed to one end of the front link 8. The front link 8 is pivotally connected to the hole 15 of the side frame 10, and is in engagement condition with a pinion 21. The pinion 21 is formed with a gear 22 which is rotatably supported to the side frame 10. The gear 22 is engaged with an output shaft of reduction gear set of a motor device 23.

When the seat back 2 is folded and the motor device 23 activates, the output torque rotates the wheel 20 through the pinion 21. The rotation of the wheel 20 rotates the front link 8 with a pivot point (a pin 14) to the bracket 12. The rotation of the front link 8 in turn rotates the rear link 9 forming four joint link mechanism 4. The seat assembly 1 moves into the concave portion 17, and finally, is disposed in the concave portion 17 shown as an imaginary line of FIG. 1.

When the seat assembly 1 is stored in the concave portion 17, the first elbow portion 6 of the front link 8 positions near the front end of the concave portion 17, and the second elbow portion 7 positions at forward portion in the concave portion 17. The rear link 9 positions approximately along the bottom wall of the concave portion 17 under the seat assembly being stored.

A reclining mechanism 24 with electric motor is supported to inner side and one side of the seatback frame 25. The reclining mechanism 24 makes the seatback 2 tiltable to favorable position for a user and foldable for storing.

A wire harness 26, which is required to activate the motor 23 and the reclining mechanism 24, is provided along one side of the rear link 9 from the bottom of the concave portion 17. Additionally, the wire harness 26 is branched off to a wire harness 26-1 provided along the side frame 10 to be connected with the motor device 23 and a wire harness 26-2 provided along the seatback frame 25 to be connected with the reclining mechanism 24.

A cover 27 formed with horseshoe in cross section is fixed to inner side of the rear link 9. The wire harness 26 is wired in a space 28, which is arranged between the rear link 9 and the cover 27. The cover prevents irregular movement of the extra length portion of the wire harness 26.

The rear link 9 is provided along the bottom of the concave portion 17 in the stored seat condition. The entangling with the links 8, 9, frames 10, 25, baggage and occupant of the vehicle by wire harness 26 can be prevented while storing/resetting of the seat assembly 1 since the wire harness 26 is covered with the cover 27 along the rear link 9.

The extra length of the wire harness 26 is taken place in the branched region of the wire harness 26-1 and the wire harness 26-2. By clamping suitable part of the wire harnesses 26-1, 26-2 to each frame 10, 25, the play of the wire harness is reduced, and the entangling is prevented.

Figure 5:
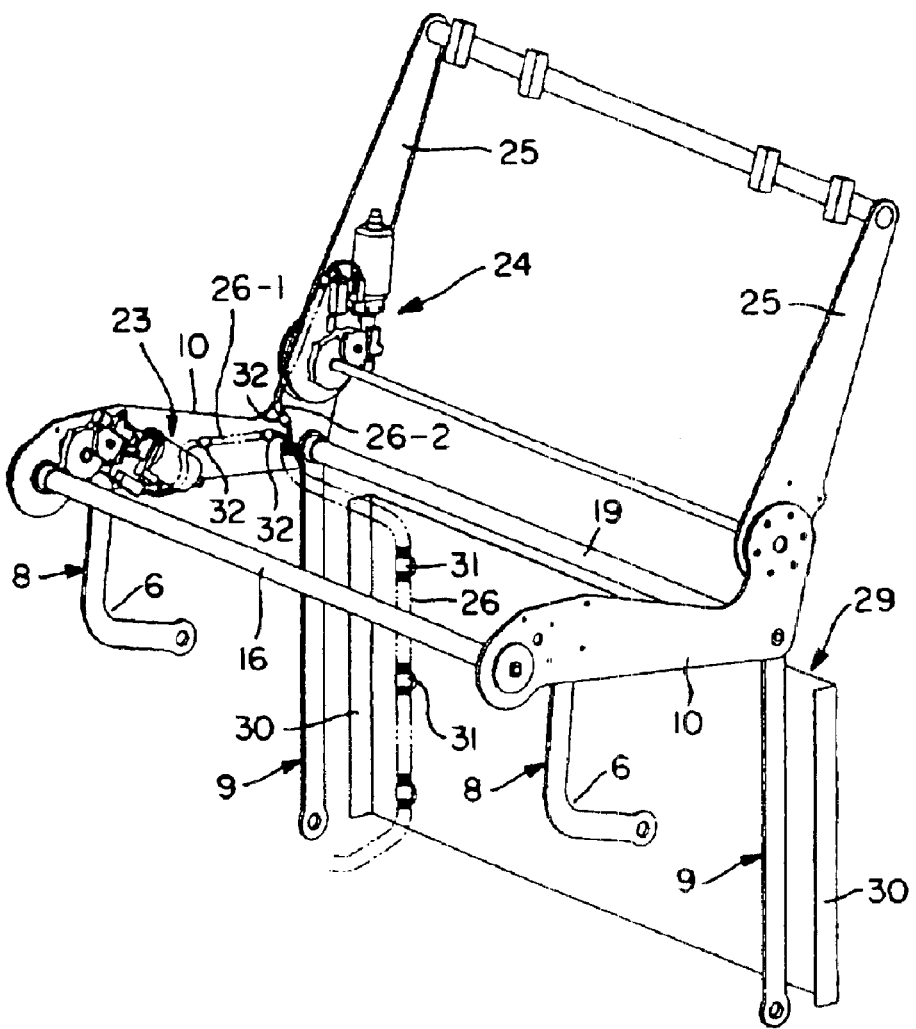
FIG. 5 is a perspective view of a seat assembly according to a second embodiment of the present invention.
Figure 6:
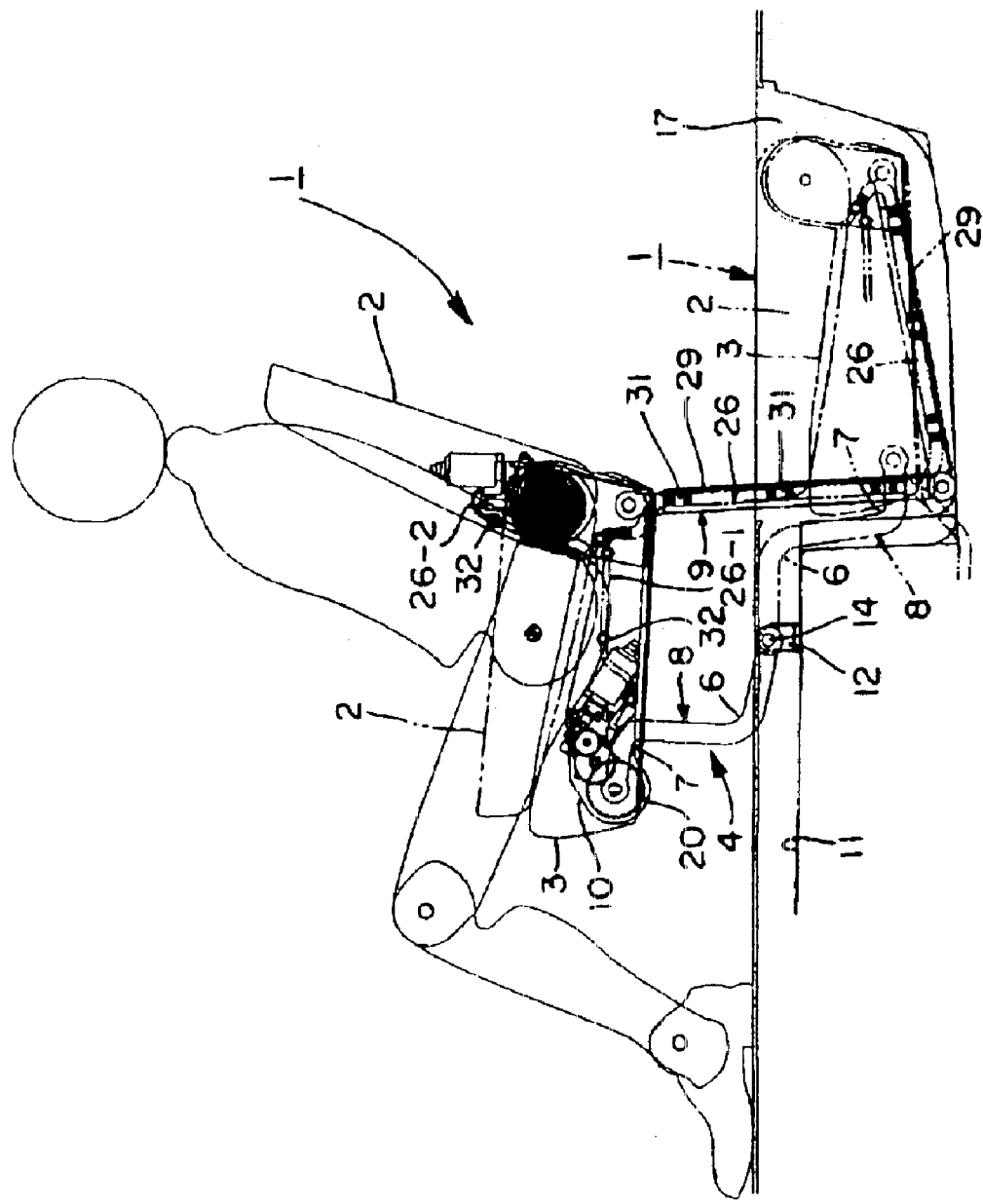
FIG. 6 is a side view of a seat assembly in stored condition according to the second embodiment of the present invention.

A second embodiment of the present invention is explained referring to FIGS. 5 and 6. In the second embodiment, a plate or a board 29 is used in place of the cover 27 of the first embodiment. The plate 29 made of resin or synthetic resin is provided at backward of the seat assembly and extends between each rear link 9, 9.

Flanges 30 provided along the rear link 9 are included at each side end of the plate 29. The flange 30 is fixed to outside of the rear link 9. The wire harness 26 is fixed to side of the motor device 23 and foreside of the plate 29 using a clamp 32. The wire harness 26 is provided along the plate 29 from the bottom of the concave portion 17 to upward, and through foreside of the rear link 9, branched off to wire harnesses 26-1, 26-2 provided along the side frame 10. Each wire harness is supported to the side frame 10 by using the clamp 32. In this condition, an extra length portion of the wire harnesses 26-1, 26-2 is generated or is defined between the clamp 31 and the clamp 32.

According to the second embodiment (see FIG. 5), the extra length of the wire harness 26 is only provided at upper part and lower part. Therefore, entangling and damage are prevented while storing/resetting of the seat assembly 1. In addition, good appearance of the seat assembly 1 is kept from backward since the plate 29 covers the wire harness 29 in the using condition.

FIG. 6 shows the stored condition of the seat assembly 1 in the concave portion 17. Flagging of the wire harness 26 and entangling of the wire harness 26 to the concave portion 17 are prevented since the plate 29 is provided face to face with bottom of the concave portion 17. The extra length of the wire harness 26 does not prevent the seat assembly 1 movement, and from pinching to other parts is also prevented.

The principles, a preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A seat assembly for a vehicle comprising:

a four joint link mechanism for storing a seat into concave portion provided on a floor of the vehicle; and a motor device driving the four joint link mechanism;

wherein a wire harness connected to the motor device is wired in a space provided between a cover attached to a rear link which forms the four joint link mechanism and the rear link.

2. A seat assembly for a vehicle comprising a four joint link mechanism for storing a seat into a concave portion provided on a floor of the vehicle and a motor device driving the four joint link mechanism, wherein a wire harness connected to the motor device is provided between a pair of rear links forming the four joint link mechanism and extends along the front surface of a plate supported by the rear links.

3. A seat assembly according to claim 2, wherein the wire harness is extended from a bottom of the concave portion to a side frame of a seat cushion.

4. A seat assembly according to claim 3, wherein the wire harness is connected to a reclining mechanism supported by a seatback frame.

5. A seat assembly according to claim 4, wherein the wire harness branches off at a portion of the side frame, and the branched portion is clamped to the side frame.

6. A seat assembly according to claim 1, wherein the wire harness is extended from a bottom of the concave portion to a side frame of a seat cushion.

7. A seat assembly according to claim 6, wherein the wire harness is connected to a reclining mechanism supported by a seatback frame.

8. A seat assembly according to claim 7, wherein the wire harness branches off at a portion of the side frame, and the branched portion is clamped to the side frame.

* * * * *